United States Patent [19]
Kim et al.

[11] Patent Number: 6,014,191
[45] Date of Patent: Jan. 11, 2000

[54] LIQUID CRYSTAL DISPLAY HAVING REPAIR LINES THAT CROSS DATA LINES TWICE AND CROSS GATE LINES IN THE ACTIVE AREA AND RELATED REPAIRING METHODS

[75] Inventors: Dong-Gyu Kim, Suwon-si; Woon-Yong Park, Yongin-si; Jong-Woong Chang, Suwon-si, all of Rep. of Korea

[73] Assignee: Samsung Electronics Co., Ltd., Suwon, Rep. of Korea

[21] Appl. No.: 08/895,447

[22] Filed: Jul. 16, 1997

[30] Foreign Application Priority Data

| Jul. 16, 1996 | [KR] | Rep. of Korea | 96-28688 |
| Jun. 11, 1997 | [KR] | Rep. of Korea | 97-24140 |
| Jun. 25, 1997 | [KR] | Rep. of Korea | 97-27110 |

[51] Int. Cl.[7] .............. G02F 1/1333; G02F 1/13
[52] U.S. Cl. ................ 349/54; 349/55; 349/192; 349/40
[58] Field of Search .............. 349/54, 55, 192, 349/40; 345/93

[56] References Cited

U.S. PATENT DOCUMENTS

| 5,303,074 | 4/1994 | Salisbury | 349/55 |
| 5,475,246 | 12/1995 | Wei et al. | 257/291 |
| 5,517,341 | 5/1996 | Kim et al. | 349/42 |
| 5,517,342 | 5/1996 | Kim et al. | 349/43 |
| 5,608,245 | 3/1997 | Martin | 257/291 |
| 5,684,547 | 11/1997 | Park et al. | 349/54 |
| 5,686,977 | 11/1997 | Kim et al. | 349/38 |
| 5,729,309 | 3/1998 | Na et al. | 349/54 |
| 5,767,929 | 6/1998 | Yachi et al. | 349/40 |
| 5,859,679 | 1/1999 | Song | 349/54 |

*Primary Examiner*—William L. Sikes
*Assistant Examiner*—Kari M. Horney
*Attorney, Agent, or Firm*—Jones Volentine, L.L.P.

[57] ABSTRACT

The present invention relates to a liquid crystal display having repair lines and methods of repairing defect in the same. The liquid crystal display comprises a plurality of gate lines in horizontal direction, a plurality of data lines perpendicular thereto, and a plurality of repair lines repeatedly formed corresponding to a fixed number of data lines. The repair line comprises an upper portion crossing top of the data lines, a lower portion crossing bottom of the data lines, and a middle portion which is parallel to the data line connecting the upper and the lower portions. A repair line is formed repeatedly for each data-line block which consists of data lines in any multiples of three. Under the above wiring structure, a disconnected data line is repaired by shorting the crossing points of the data line and the repair line corresponding to the data-line block of the disconnected data line.

20 Claims, 17 Drawing Sheets

LIQUID CRYSTAL DISPLAY HAVING REPAIR LINES THAT CROSS DATA LINES TWICE AND CROSS GATE LINES IN THE ACTIVE AREA AND RELATED REPAIRING METHODS

BACKGROUND OF THE INVENTION

The present invention relates to a liquid crystal display and, more particularly, a liquid crystal display having repair lines and methods of repairing a defect thereof.

The liquid crystal display (LCD) is a device comprising a thin film transistor substrate, a color filter substrate, and liquid crystals inserted between the two, whereby the electro-optical effects of the inserted liquid crystals are used for display purposes.

The display method above may use simple matrix method or active matrix method. For LCDs using the active matrix method, thin film transistors (TFT) are generally used as switching devices for controlling operation of each pixel, and the TFT substrate of such LCDs comprises TFTs, pixel electrodes, gate lines for applying signals to pixels aligned in matrix formation, and data lines for applying picture signals.

When a data line of the active matrix LCD is disconnected or defective (hereinafter "disconnection" will be used to refer to either a disconnection or defect in a data line), the disconnection can be repaired by using lines within the unit pixel or using repair lines placed outside of the substrate of LCD. Under the former method, one must first locate the disconnected data line and then find the point of disconnection on the data line. However, it is difficult to find the point of disconnection and the repair becomes impossible when the disconnection occurs over two or more pixels.

Under the latter method, it is only required to locate the disconnected data line and there is no need to find the point of disconnection. Then only the crossing points of the disconnected data line and the repair line has to be shorted by laser, allowing for a much simpler repairing method.

From this point, the wiring structure of TFT substrate of conventional LCD and its disconnection repairing method shall be explained in detail. FIG. 1 is a wiring structure of conventional TFT substrate having two repair lines in the shape of a closed loop. As shown, a plurality of gate lines ($G_1$~$G_n$) are arranged in horizontal direction, and a plurality of data lines ($D_1$~$D_m$) are arranged in vertical direction, and each of gate lines and data lines has an input pad on one end. A pixel is defined by the gate line and the data line. An active area consists of all the pixels.

On the outside of the active area 50 having (n×m) number of pixels, two repair lines 100, 200 form two closed loop, each overlapping all data lines and gate lines at two points.

FIG. 2 illustrates a repairing method of the TFT substrate shown in FIG. 1. Suppose data line $D_4$ and data line $D_7$ are disconnected at point a and point b, respectively. The data line $D_4$ may be repaired by shorting its two crossing points $a_1$, $a_2$ with the repair line 100 and disconnecting two points marked //, of the repair line 100 with laser so that picture signals could flow through the shorter path. In this way, a picture signal is sent to the disconnected point a of the data line $D_4$ by path $P_1$ from the top, and the signal is sent to the remaining portion of the data line $D_4$ by path $P_1'$.

Then the data line $D_7$ may be repaired by shorting its two crossing points $b_1$, $b_2$ with the repair line 200 and disconnecting two points of the data line $D_7$ marked by //, of the repair line 200 with laser. In this way picture signals as with before are sent to the disconnected point b from top by path $P_2$, and the signal is sent to the remaining portion of the data line $D_7$ below the disconnection by path $P_2'$.

However, the TFT substrate having repair lines outside of the active area in closed loops would experience substantial electrical resistance when repairing a disconnected data line in the middle of active area since the signal path for sending signals to the data line below the disconnection becomes quite lengthy. In addition to large resistance, there would be a substantial parasitic capacitance increase since the repair line overlaps numerous data and gate lines, resulting in increase of RC delay and signal distortion.

Therefore, the conventional repair line structure above is not suitable for a large LCD with many data lines and gate lines. It is also inconvenient since it involves an additional step of disconnecting the repair line to guide the flow of signals through the shorter path around the repair line, as well as a step of shorting the crossing points of the repair line and the disconnected data line. Moreover, the most data lines that could be repaired are limited to four.

SUMMARY OF THE INVENTION

An object of the present invention is to solve the problems associated with the conventional repair wire line structure by repeatedly forming a repair line for each of a predetermined number of data lines, thereby minimizing the increase of RC delay resulting from the repair and making data line repair easy.

Accordingly, a liquid crystal display according to the present invention comprises: a plurality of gate lines arranged in horizontal direction; a plurality of data lines arranged perpendicular thereto; a plurality of repair lines formed repeatedly for each of a predetermined number of data lines, the repair lines crossing the gate lines in the active area.

According to a one preferred embodiment of the present invention, the repair line comprises an upper portion crossing top of the data lines, a lower portion crossing bottom of the data lines, and a middle portion which is parallel to the data line connects the upper and the lower portions. A repair line is formed repeatedly for each data-line block including data lines in any multiple of three. A disconnected data line is repaired by shorting the crossing points of the data line and the repair line corresponding to the data-line block of the disconnected data line, making its repair procedure simpler and resulting in shorter signal path after the repair in comparison to the conventional repair method.

Another preferred embodiment of the present invention is directed to eliminating a problem of noticeable pixel brightness difference resulting after the repair with respect to green data line. The middle portion of the repair line is formed adjacent to the green data line and they are connected at one or more points to minimize the generation of RC delay due to the repair so that difference in green pixel brightness would not be noticed.

In another preferred embodiment of the present invention in connection with a liquid crystal display having duplicate gate lines, a repair line includes only a middle portion which is placed parallel to the data lines and secondary gate lines serve as the upper and lower portions of the repair line.

BRIEF DESCRIPTION OF THE DRAWINGS

The forgoing and other objects, features and advantages of the present invention will become more readily apparent from the following detailed description of preferred embodi-

Figure 1:
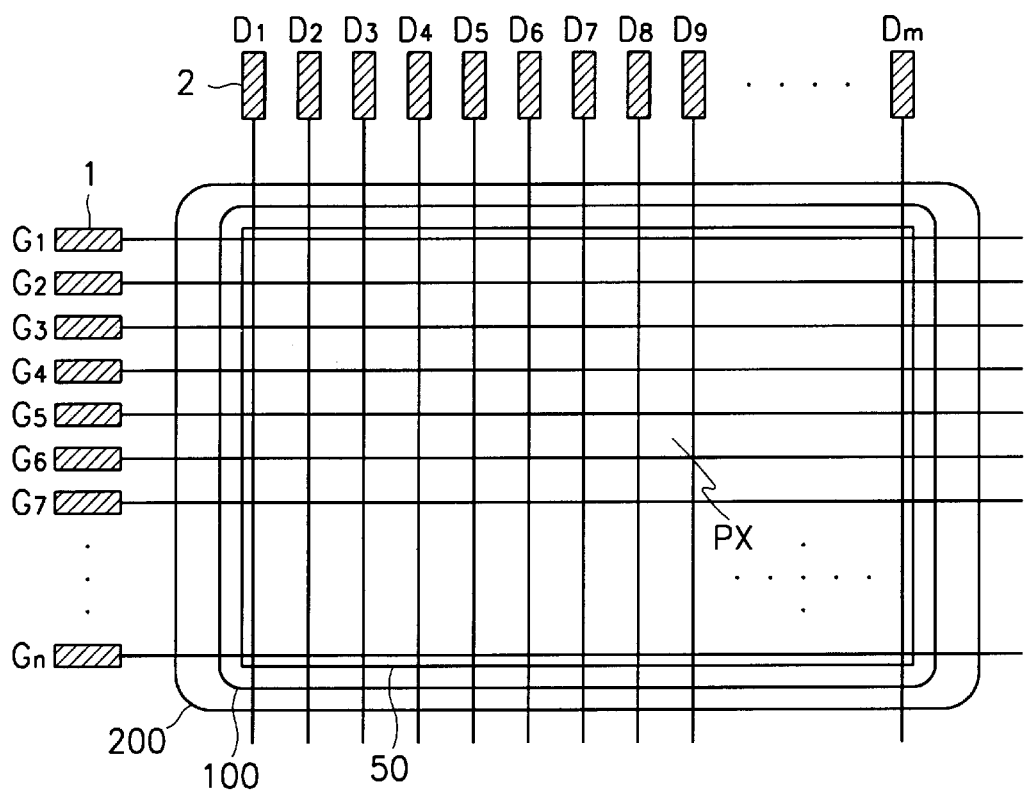
Figure 2:
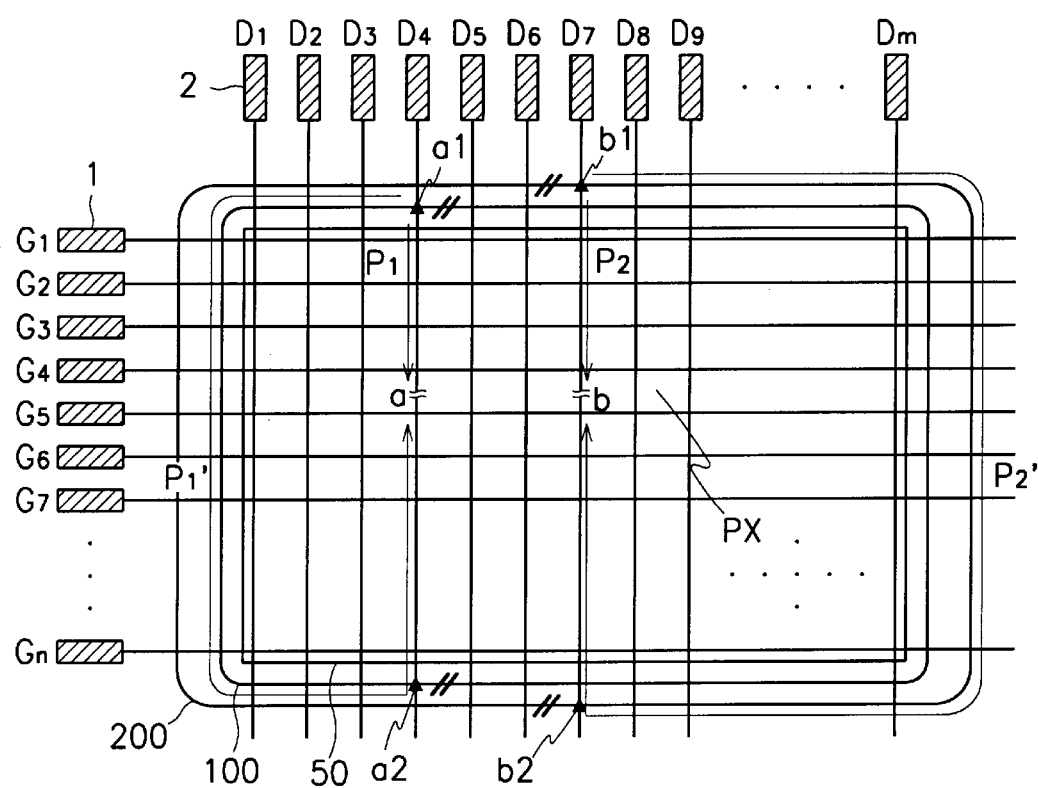
Figure 6:
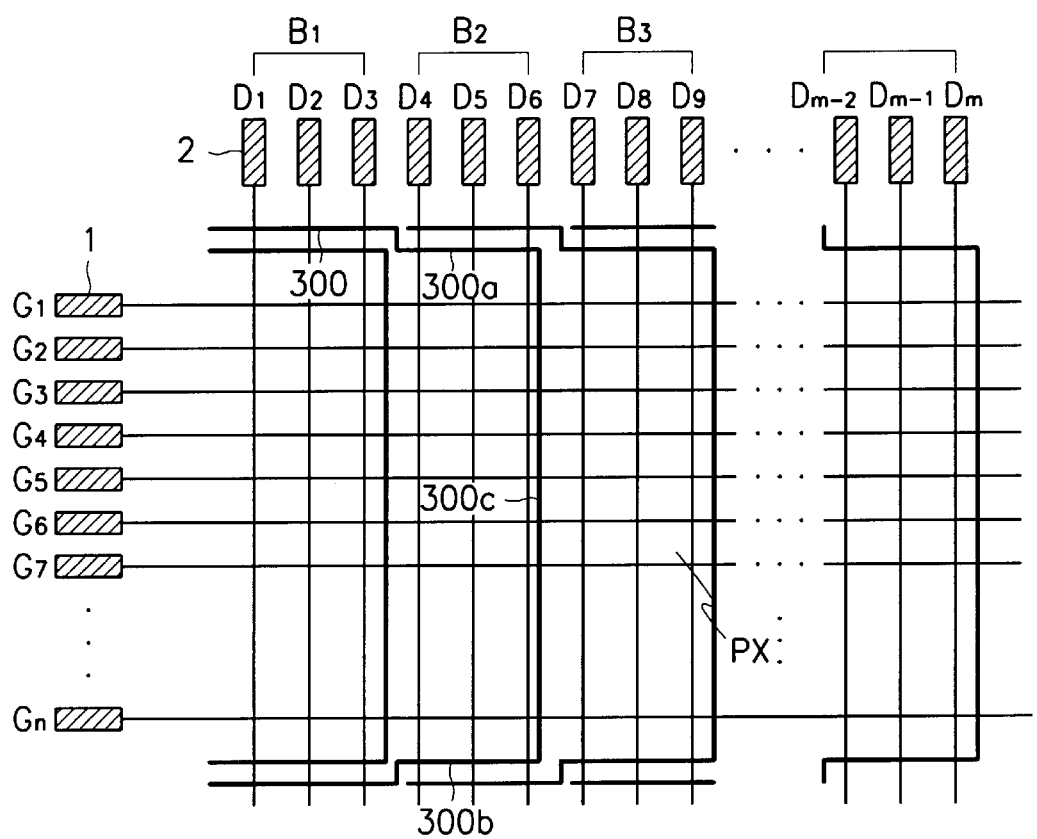
Figure 9:
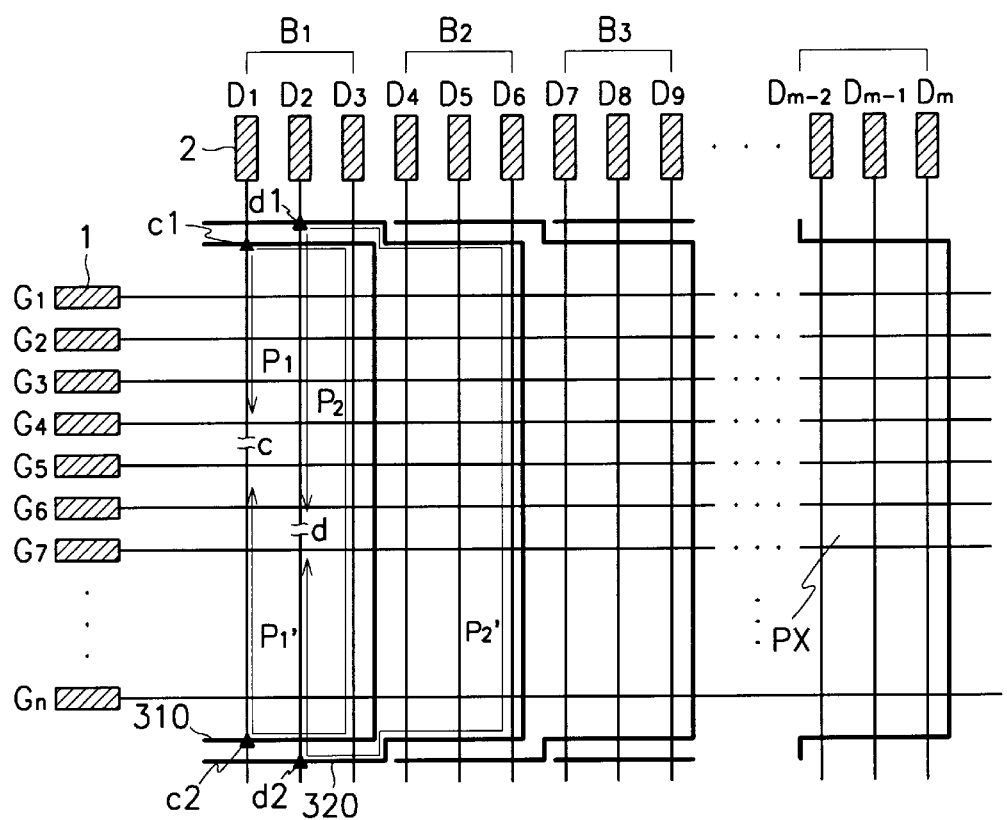
Figure 10:
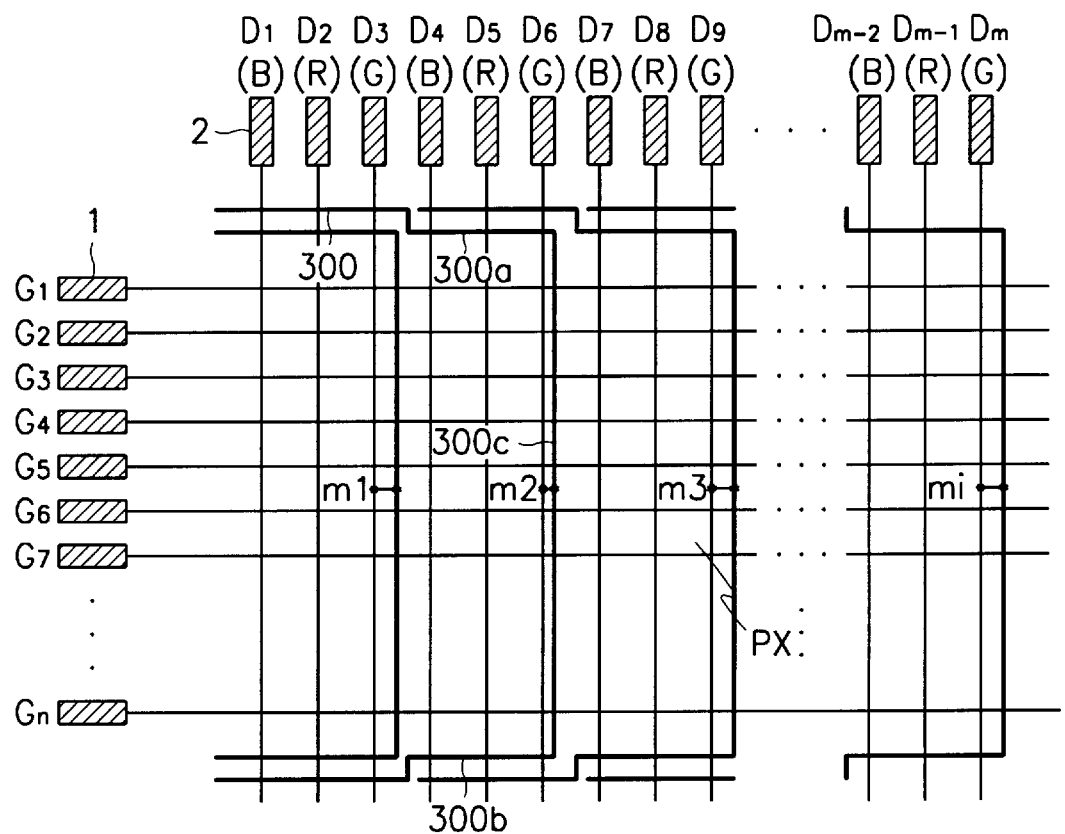
Figure 11:
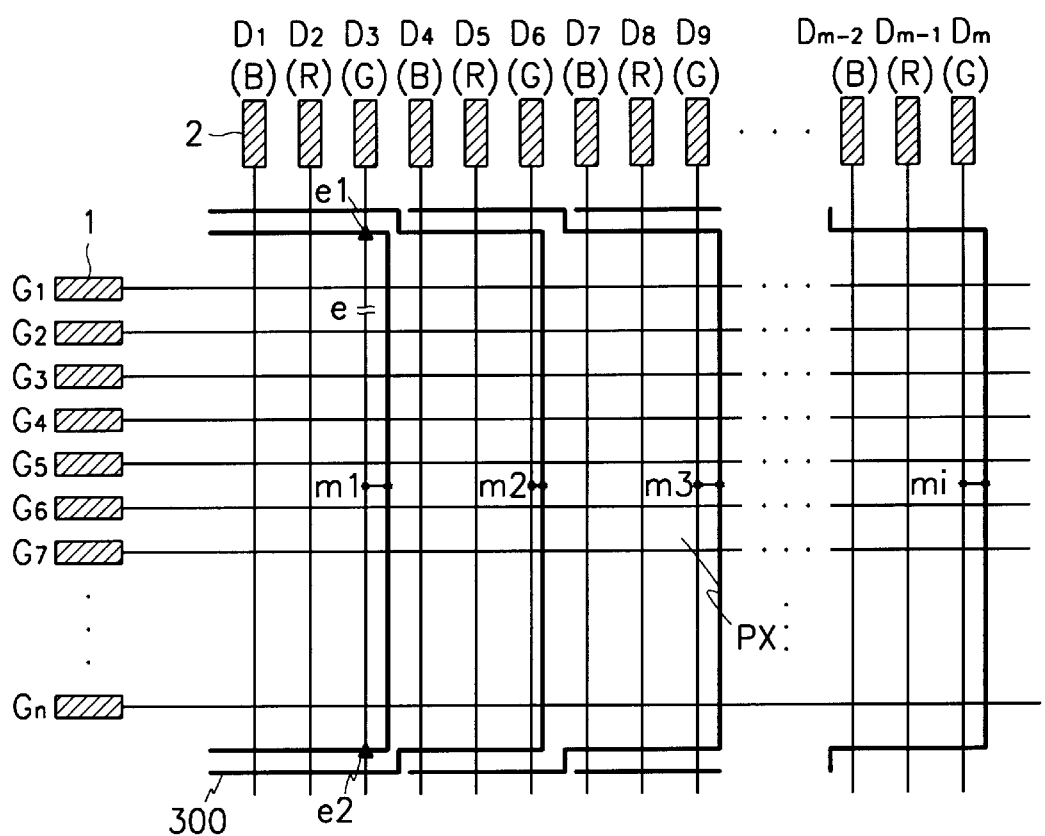
Figure 12:
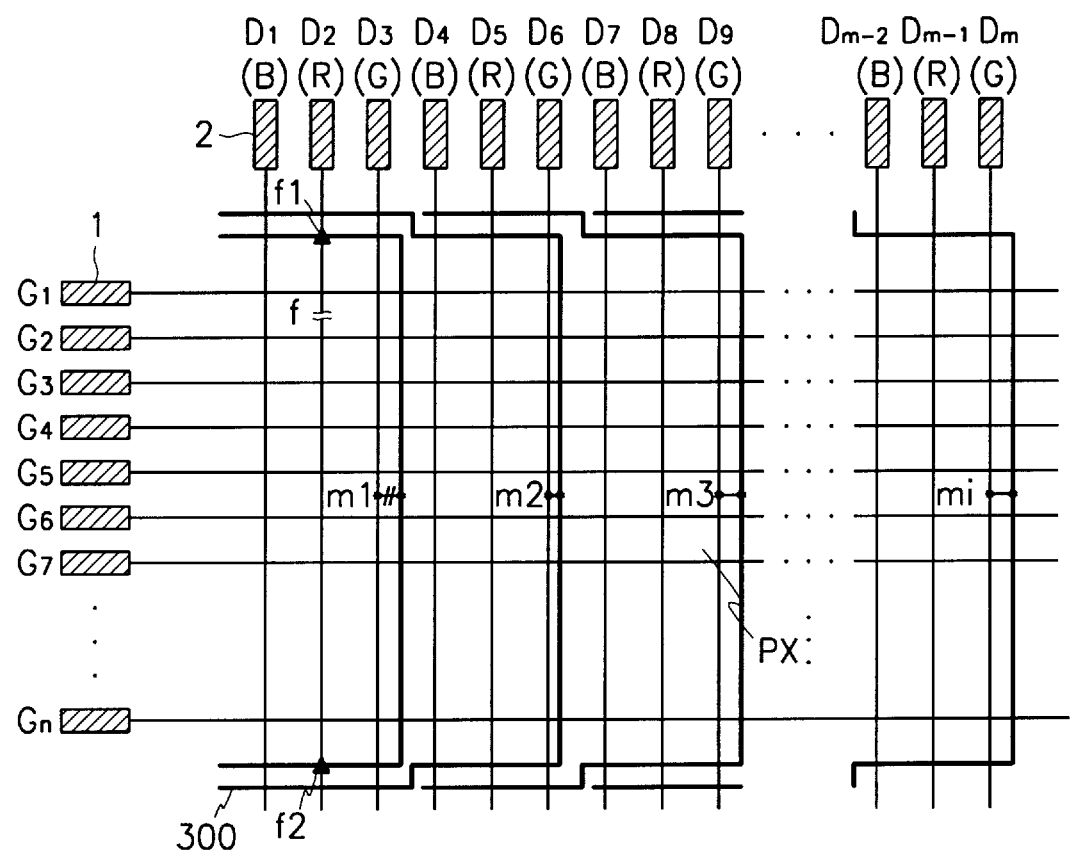
Figure 13:
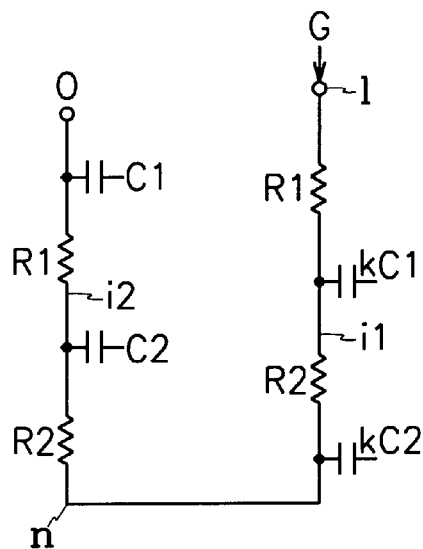
Figure 14:
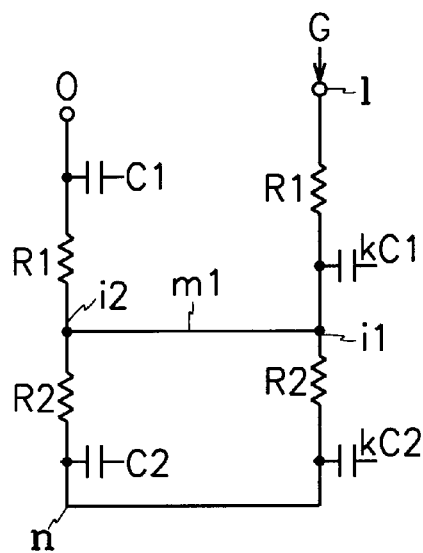
Figure 15:
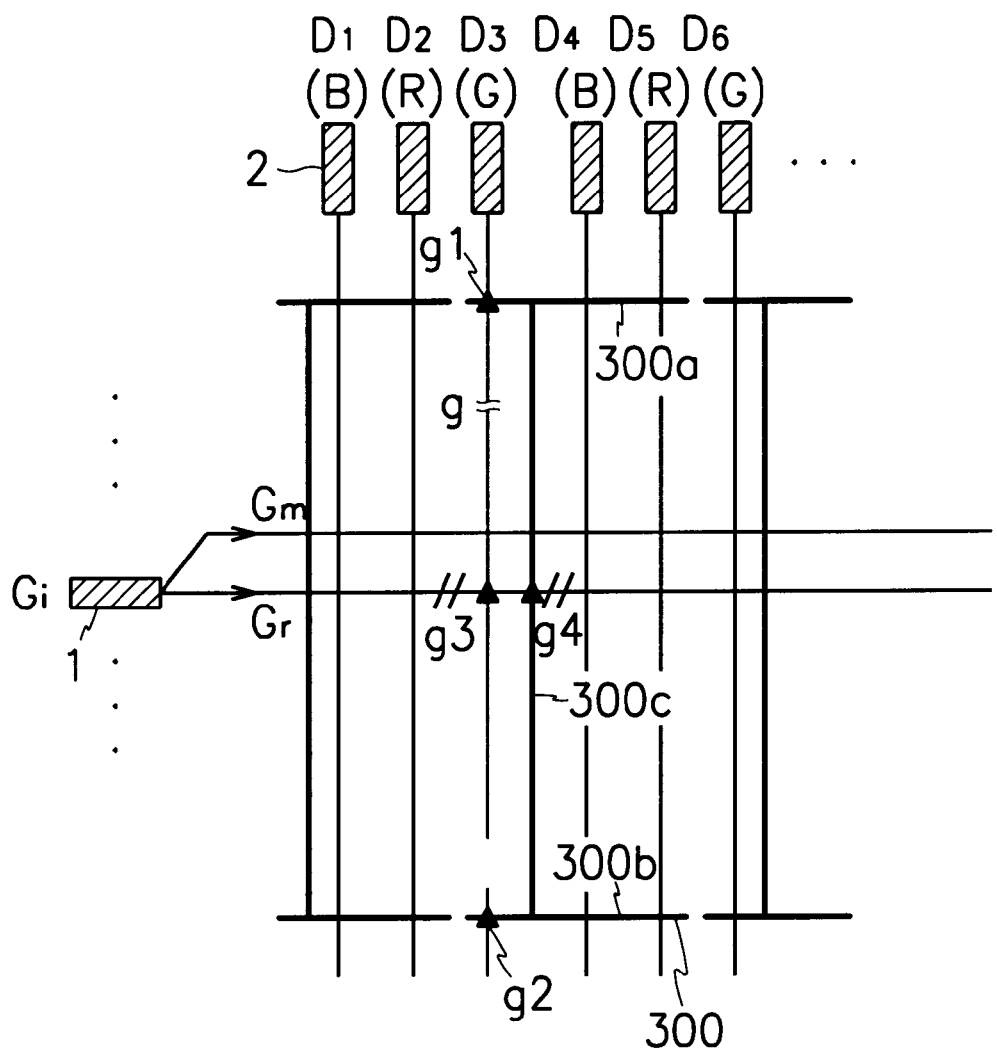
Figure 16:
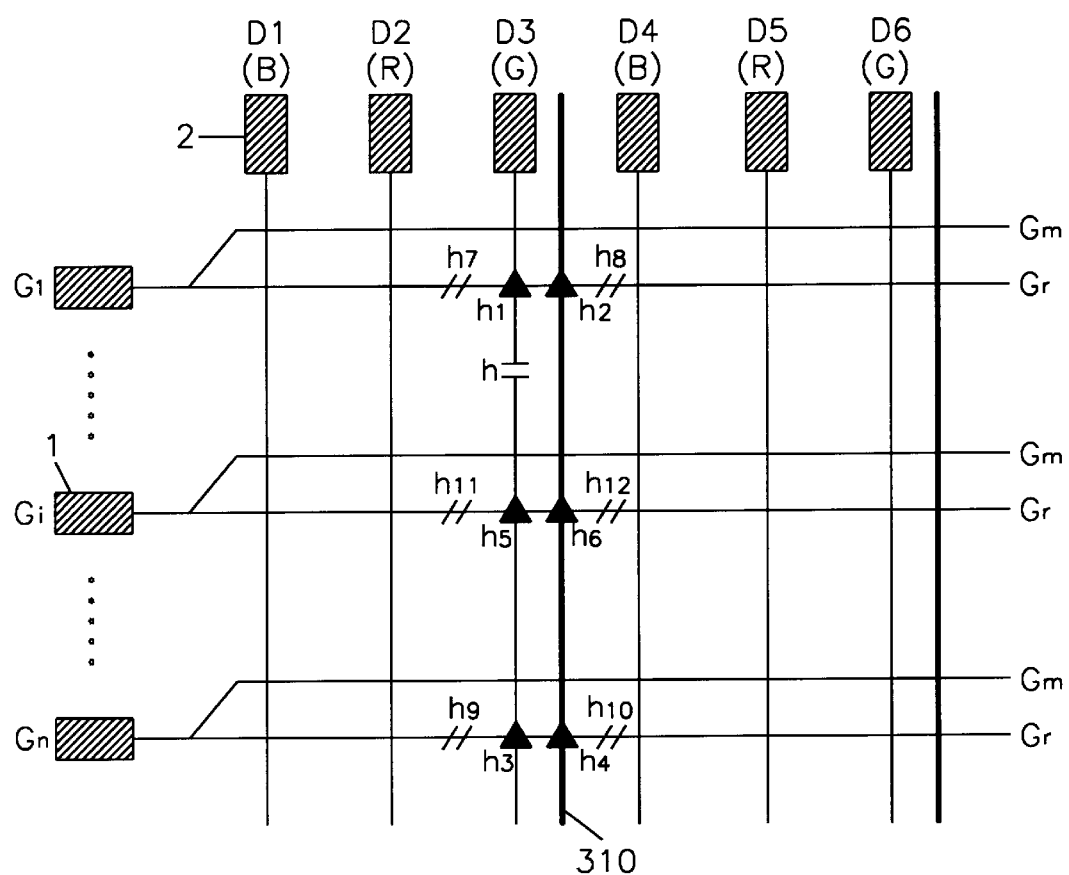
Figure 17:
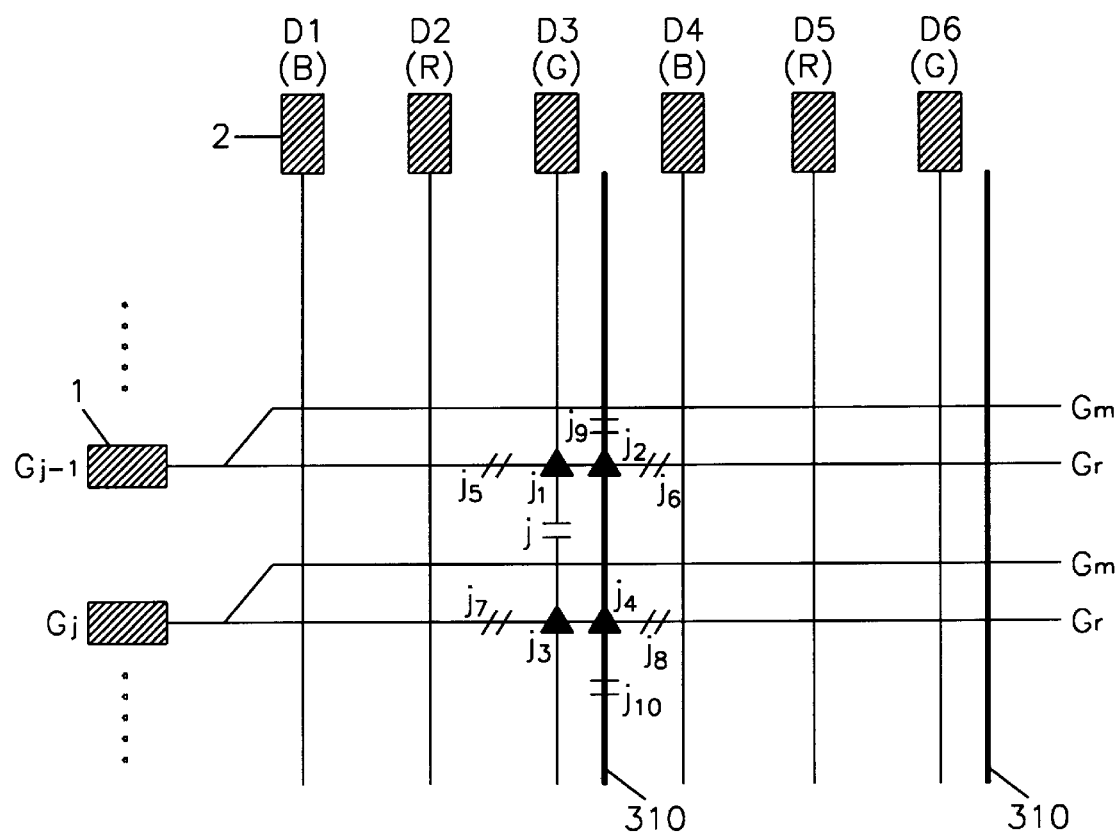
Figure 18:
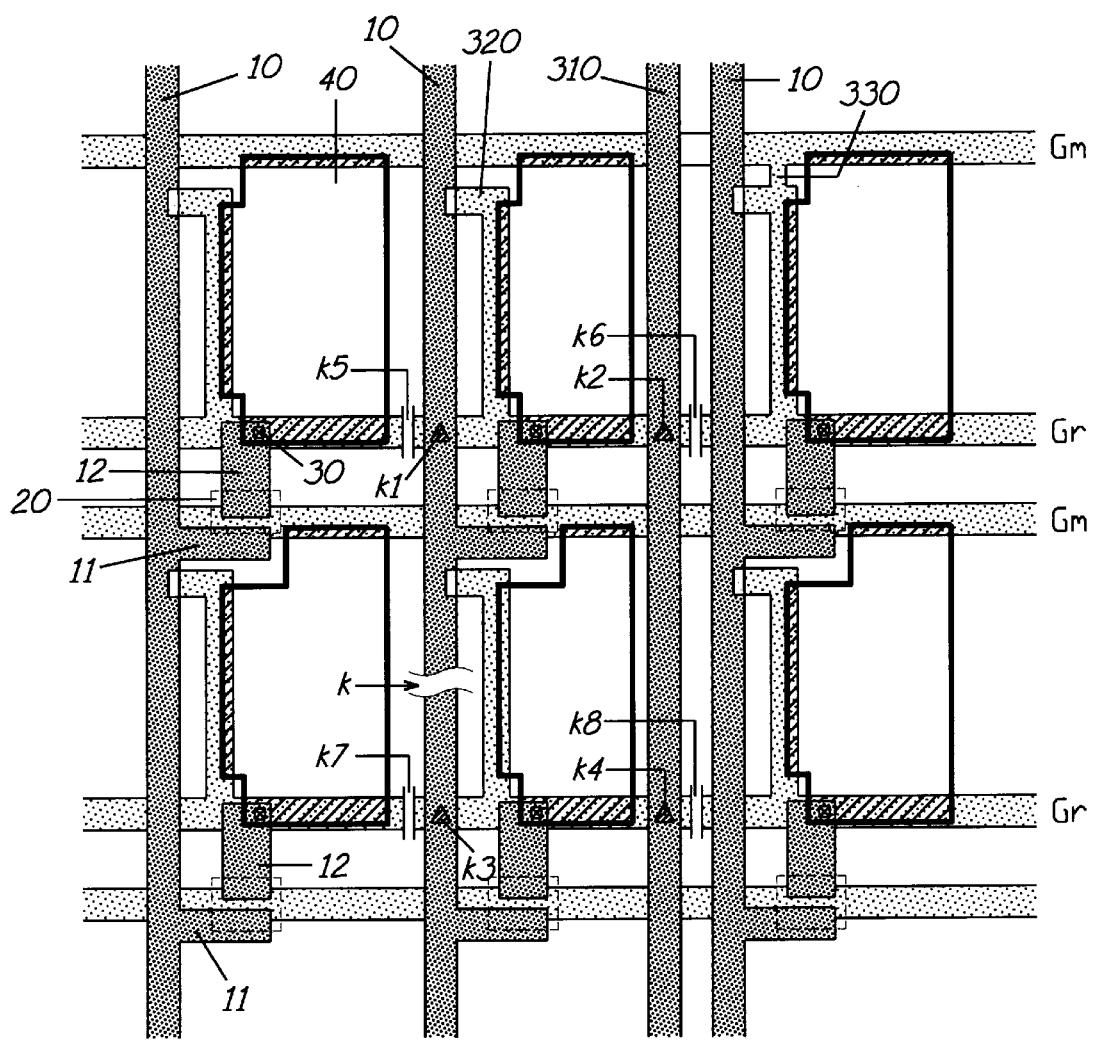

3 ments of the present invention which proceeds with reference to the accompanying drawings, wherein:

FIG. 1 is a wiring structure of a conventional TFT substrate having two repair lines formed in closed loops;

FIG. 2 illustrates repairing method of the TFT substrate shown in FIG. 1;

FIGS. 3 to 8 show the wiring structure of TFT LCD according to a first preferred embodiment of the present invention;

FIG. 9 illustrates repairing method of a disconnected data line in the TFT substrate of FIG. 6;

FIG. 10 shows the wiring structure of TFT LCD according to a second preferred embodiment of the present invention;

FIGS. 11 and 12 illustrate repairing method of a disconnected green and red data lines of FIG. 10;

FIGS. 13 and 14 show equivalent circuits which represent electrical resistance and parasitic capacitance resulting from the electrical lines of TFT LCD according to the first and second preferred embodiment of the present invention;

FIG. 15 illustrates a repairing method of a disconnected data line of TFT LCD having duplicate gate lines according to a third preferred embodiment of the present invention;

FIGS. 16 and 17 illustrate a repairing method of a disconnected data line of TFT LCD having duplicate gate lines and repair lines parallel with data lines according to a fourth preferred embodiment of the present invention; and FIG. 18 shows a wiring structure of an LCD having duplicate gate lines and connections according to a fifth preferred embodiment of the present invention.

DETAILED DESCRIPTION OF THE PREFERRED EMBODIMENTS

FIGS. 3 to 8 shows the wiring structure of TFT LCD according to a first preferred embodiment of the present invention. As shown, a plurality of gate lines ($G_1$~$G_n$) are arranged in parallel to each other in horizontal direction, and a plurality of data lines ($D_1$~$D_m$) are arranged perpendicular thereto. Input pads 1, 2 which receives electrical signals from external source are connected to one end of the gate lines and data lines. A plurality of repair lines 300 for repairing disconnected data lines are formed wherein each repair line 300 corresponds to each data-line block ($B_1$~$B_n$). The data-line block comprises three data lines, whereby all data lines within a data-line block overlap with the corresponding repair line 300.

The repair line 300 comprises a first horizontal portion 300a which transverses the upper end of the data lines whereto the input pads 2 is connected, a second horizontal portion 300b which transverses the other end of the data lines, and a vertical portion 300c, formed in parallel to the data lines, which connects the first horizontal portion 300a and the second horizontal portion 300b. The vertical portion 300c transverses the gate lines in the active area, and is placed adjacent to the data line of the data-line block to which it correspond.

Figure 3:
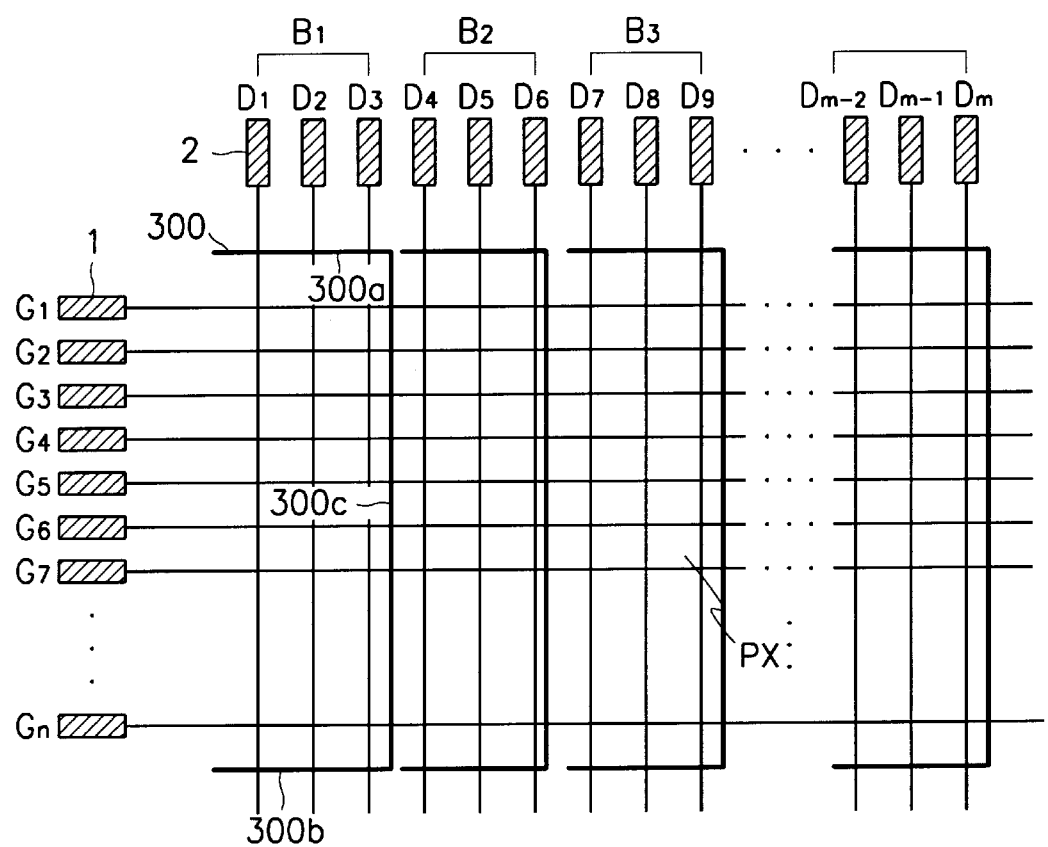
Figure 4:
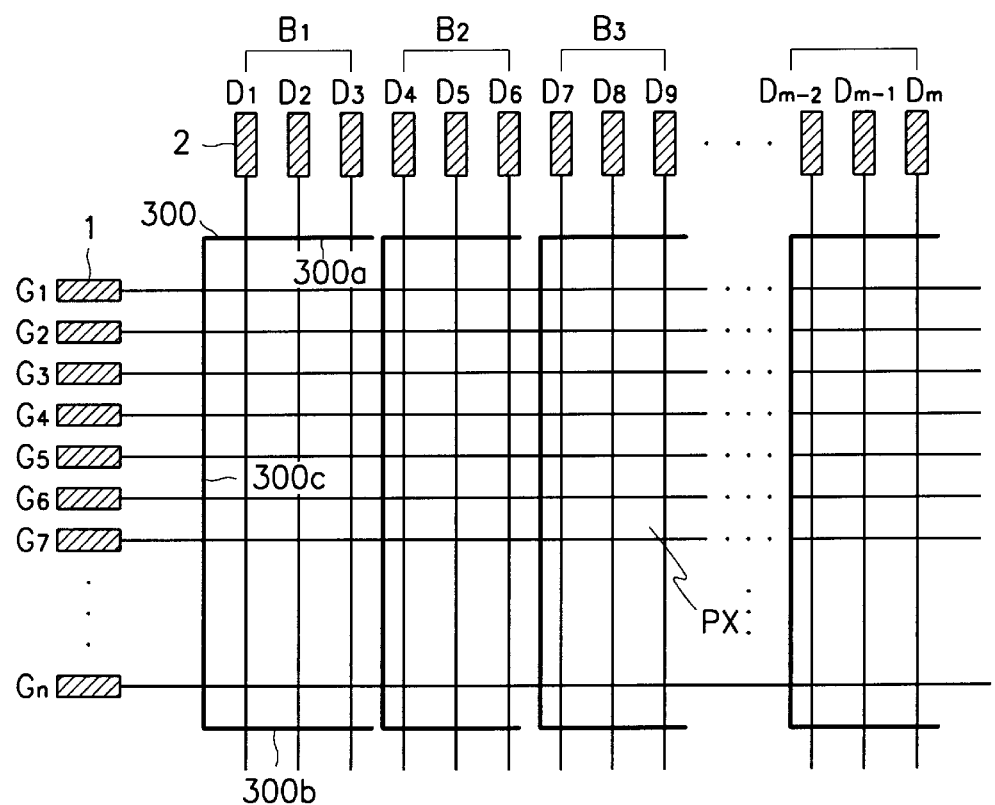
Figure 5:
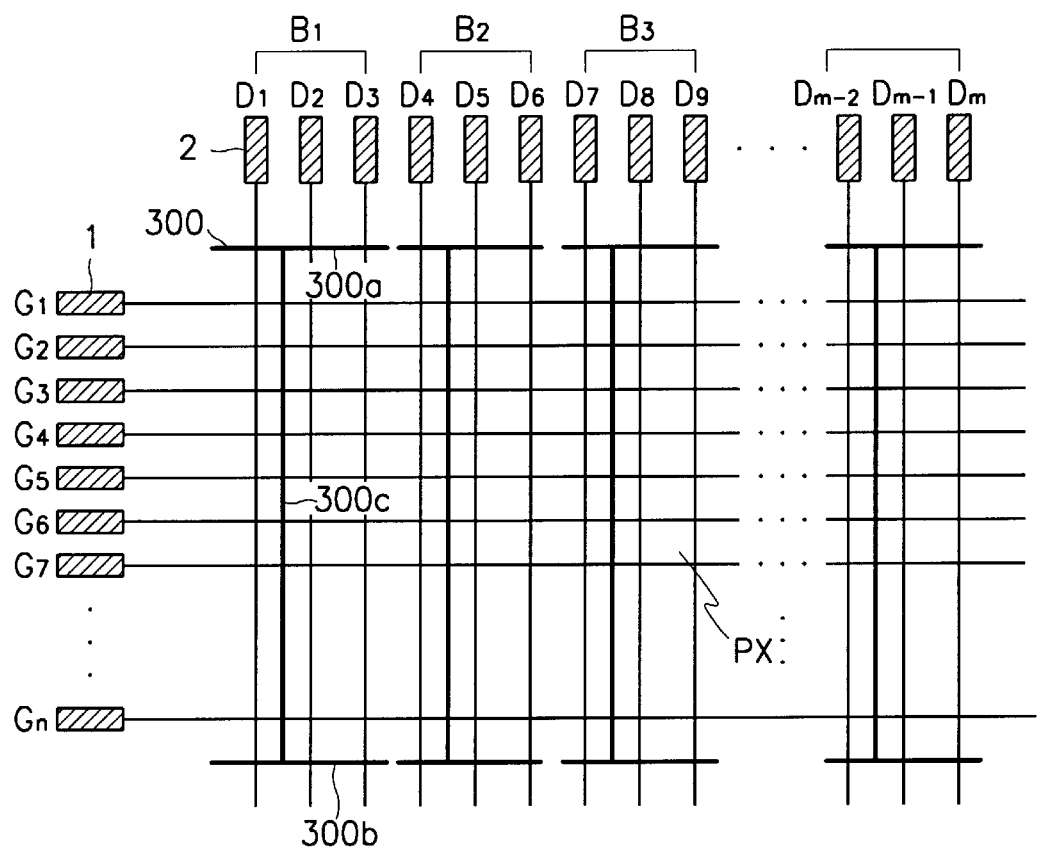

In FIGS. 3 to 5, the first and second horizontal portions 300a, 300b transverse only the three data lines within a data-line block.

In FIGS. 3 and 4, the vertical portion 300c is placed between two data-line blocks. In FIG. 3, the vertical portion 300c connects the right ends of the first horizontal portion 300a and the second horizontal portion 300b. In FIG. 4, on the other hand, the vertical portion 300c connects the left ends of the first horizontal portion 300a and the second horizontal portion 300b.

The vertical portion 300c may also be placed within a data-line block, i.e., between the data lines of a data-line block. As an example, the vertical portion 300c is placed between the first and the second data lines in FIG. 5.

Figure 7:
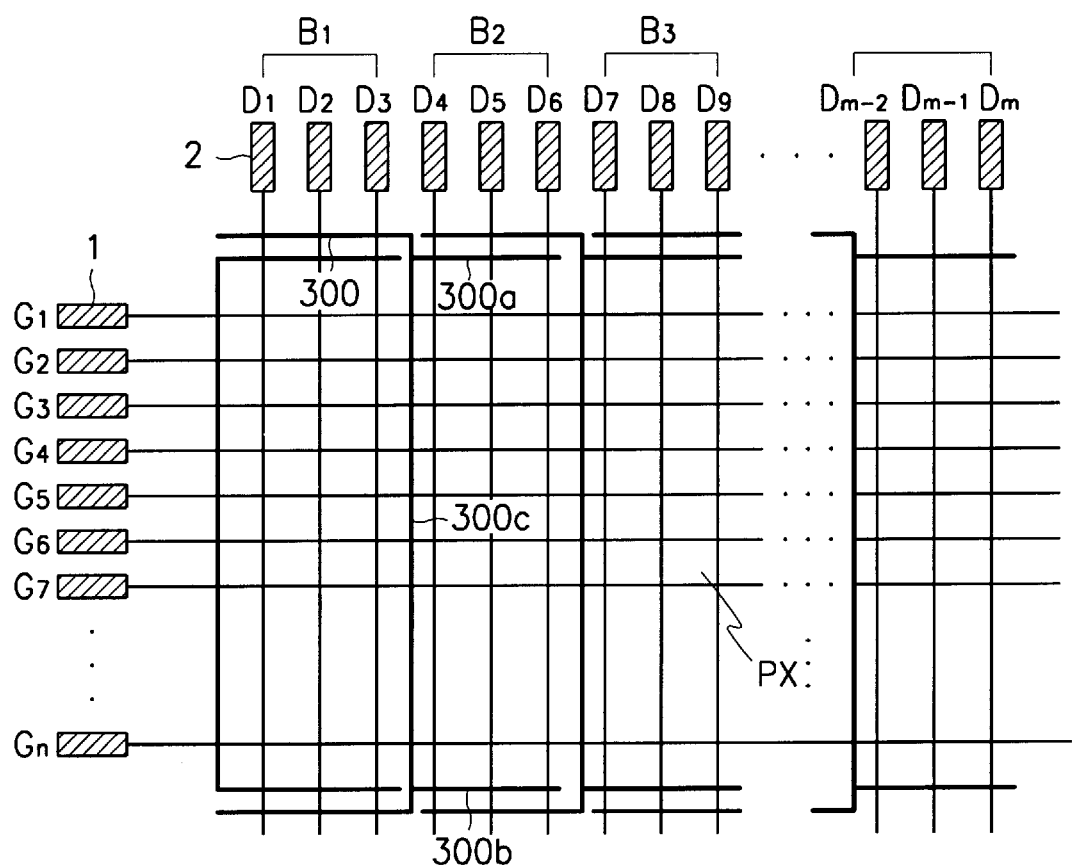
Figure 8:
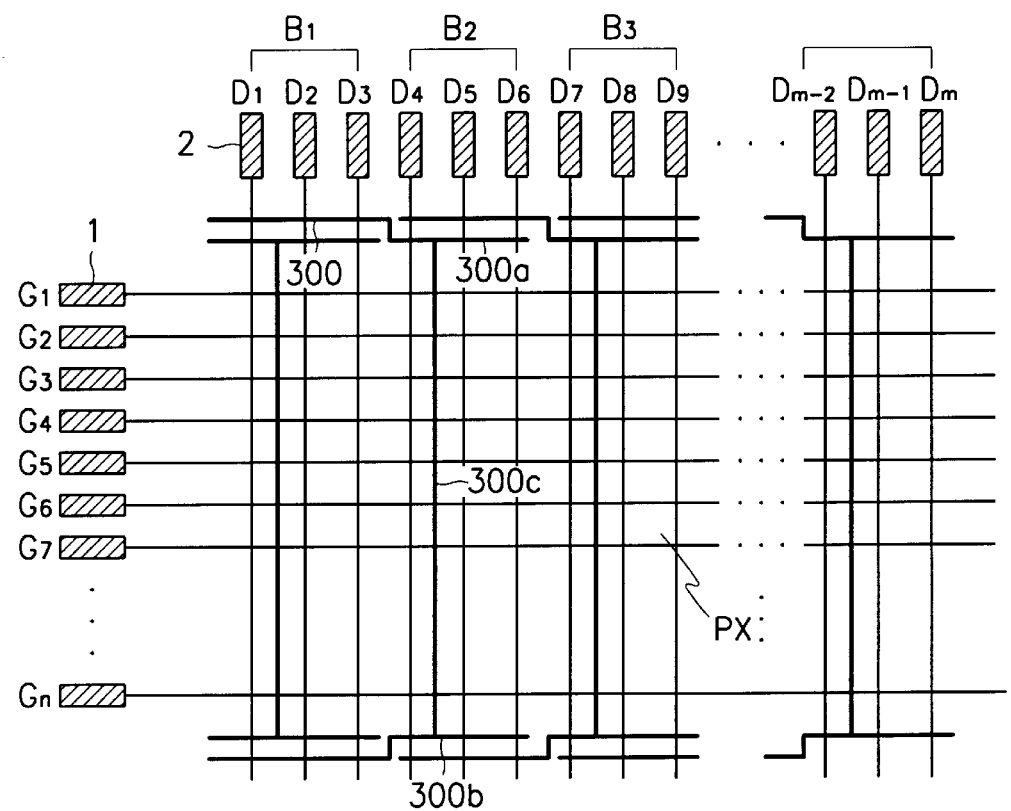

FIGS. 6 to 8 illustrate the TFT substrate wherein the first horizontal portion 300a and the second horizontal portion 300b of the repair line 300 transverse the data lines (six data lines) of two adjacent data-line blocks. Each data line is crossed by two repair lines 300. The first and second horizontal portions 300a, 300b of one of the repair line 300 cross the data lines from inside, and the first and second horizontal portions 300a, 300b of the other repair line cross the data line from outside.

In FIGS. 6 and 7, the vertical portion 300c is placed between two data-line blocks. In FIG. 6, the vertical portion 300c is connected to one end of the first horizontal portion 300a and the second horizontal portion 300b. In FIG. 7, the vertical portion 300c connects to the middle of the first horizontal portion 300a and the second horizontal portion 300b.

On the other hand, a first embodiment of the present invention illustrated in FIG. 8 shows that the vertical portion 300c is placed within one of its two corresponding data-line block.

In addition, the present invention may also be worked by increasing the size of a data-line block from three to six data lines. The wiring structure would remain the same as shown in FIGS. 3 to 8, except the number of data lines in a data-line block would be increased accordingly, whereby the first and second horizontal portions 300a, 300b each cross six data lines or twelve data lines, depending on the particular type of embodiment being worked.

Hereinafter, for FIGS. 3 to 5, a repair line which crosses data lines will be referred as the repair line of the data-line block to which the crossed data lines belong, and for FIGS. 6 to 8, a repair line which crosses data lines from inside will be referred as the repair line of the data-line block to which the crossed data lines belong.

FIG. 9 illustrates a repairing method of the TFT substrate of FIG. 6. As shown, suppose that the data lines $D_1$, $D_2$ of the first data-line block $B_1$ are disconnected. In order to repair the data line $D_1$, the crossing points $c_1$, $c_2$ of the data line $D_1$ and the repair line of the first data-line block are shorted (▲) with laser. As a result, picture signals are sent from the input pad 2 to the disconnection c by path $P_1$, and sent to the remaining portion below the disconnection c by path P1'.

Next in order to repair the data line $D_2$, the crossing points $d_1$, $d_2$ of the data line $D_2$ and the repair line of the second data-line block are shorted (▲) with laser. As a result, picture signals are sent from the input pad 2 to the disconnection d by path $P_2$, and sent to the remaining portion below the disconnection d by path $P_2$'.

As illustrated, the repair signal path for sending picture signals to a disconnected data line would be shorter than that of the conventional repair line structure, irrespective of where the disconnection occurs if the above repair line structure is used.

Moreover, in comparison to the conventional repair line structure in the form of a closed loop which allows for repairing of only four data lines, many more repairs may be made under the present invention since a plurality of repair lines are formed repeatedly on the TFT substrate. Further, since the repair lines under the present invention has an opening on one side in contrast to a closed loop, the only necessary repairing step is to short the two crossing points of the repair line and the disconnected data line. There is no need for an additional step of disconnecting one side of the repair line to direct the flow of signal to one path.

The above repairing method also applies to an embodiment of the present invention wherein the horizontal portions of a repair line cross six data lines.

With respect to the first preferred embodiment, the signal path after the repair is substantially longer than the signal path before the repair; consequently, RC delay resulting from the resistance and capacitance after the repair is greater than that before the repair. Therefore, the pixel brightness varies slightly after the repair. This slight difference in pixel brightness does not pose a problem in connection with repairing of red and blue data lines, but this is not the case when a green data line is repaired since human eyes are much more sensitive to the wave length of the green light (550 nm) than that of other lights.

That is, suppose red, blue, and green data lines each are disconnected at the same location and repaired according to the first preferred embodiment. The repaired data lines each would have identical RC delay value resulting from resistance and capacitance generated from the signal path after the repair and would have identical difference in pixel brightness. However, one would not notice the difference in pixel brightness of the repaired red data line and the repaired blue data line, but would notice the difference in pixel brightness of the repaired green data line.

The second first preferred embodiment of the present invention concerns minimizing the difference in pixel brightness of green data line. FIG. 10 illustrates the wiring structure of the second first preferred embodiment. In FIG. 10, data lines are arranged repeatedly in order of blue, red, green data lines from the left, and the vertical portion 300c of the repair line 300 is placed on the right side of the green data line. The vertical portion 300c is connected to the mid-point of the green data line. The connection ($m_1$~$m_i$) as should be explained hereinafter reduces resistance and parasitic capacitance resulting from the data line repair, thereby difference in green light brightness is minimized after the repair.

The modification of adding a connection between the green data line and the vertical portion 300c may be made on any of the embodiments illustrated in FIGS. 3 to 8.

FIGS. 11 and 12 illustrate a repairing method of the TFT substrate having connections $m_1$~$m_i$ between the vertical portions 300c and the green data lines. More specifically, FIG. 11 illustrates repairing method when the green data line $D_3$ is disconnected, and FIG. 12 illustrates repairing method when the red data line $D_2$ is disconnected.

As shown in FIG. 11, when the green data line $D_3$ is disconnected, the crossing points $e_1$, $e_2$, of the green data line $D_3$ and its repair line 300 are shorted (▲) with laser. As a result, picture signals are sent directly to the disconnection e from the input pad 2, and to the data line below the disconnection e by means of the repair line 300 and the connection $m_1$.

As shown in FIG. 12, when a red data line is disconnected, the connection of its repair line is located and disconnected with laser. Then the crossing points $f_1$, $f_2$ of the red data line and its repair lines are shorted (▲) with laser. As a result, picture signals are sent directly to the disconnection f of the red data line from the input pad 2, and to the data line below the disconnection f by means of the repair line 300.

Although the above method concerns repairing of a disconnected red data line, similar method may be used for repairing of a disconnected blue data line.

The effectiveness of adding the connections $m_1$~$m_i$ will be explained below by comparing resistance and capacitance resulting from repairing a disconnected green data line under two different embodiments, one including the connections $m_1$~$m_i$ and the other without it.

FIGS. 13 and 14 shows equivalent circuits of resistance and capacitance appearing on a data line repaired according to the first and second first preferred embodiments, wherein the disconnection had occurred nearby the input pad 2.

Suppose a disconnected green data line is being repaired. The picture signal being sent to the portion of the green data line below the disconnection would experience resistance resulting from the paths of the data line and the repair line and would experience parasitic capacitance resulting from overlap of the repair and data lines with the gate lines. The resulting resistance and parasitic capacitance are illustrated in FIGS. 13 and 14. A node 1 on the first horizontal portion and a node n on the second horizontal portion are the crossing points of the disconnected data line and its repair line, and nodes $i_1$, $i_2$ are mid-points of the vertical portion 300c and the disconnected data line, respectively, and a node o is the disconnection point.

Since the disconnection is assumed to have occurred very close to the input pad, the length from the input pad 2 to the mid-point of the repair line is almost the same as the length from the disconnection to the mid-point of the disconnected data line, as with the number of gate lines overlapped by the respective path.

Assuming that the data line and the repair line are both made of the same material and have the same cross sectional dimensions, it may be assumed that the resistance and the parasitic capacitance between the nodes 1 and $i_1$ are the same as those between the nodes o and $i_2$, and the resistance and the parasitic capacitance between the nodes i1 and n are the same as those between the nodes $i_2$ and n.

However, this is not entirely true because there is a TFT on the crossing point of the data line and the gate line unlike in the overlap of the repair line and the gate line, resulting in formation of parasitic capacitance in the former overlap. Therefore, in reality total parasitic capacitance generated between the nodes o and n is greater than that generated between the nodes 1 and n.

With this in mind, the resistance and capacitance values in the nodes may be denoted as follows. When the resistance between the nodes o and $i_2$ and between the nodes $i_2$ to n are denoted as $R_1$ and $R_2$, respectively, the resistance between the nodes 1 and $i_1$ and between the nodes $i_1$ and n may be denoted as $R_1$ and $R_2$, respectively. When the parasitic capacitance between the nodes o and $i_2$ and between the nodes $i_2$ and n are denoted as $C_1$ and $C_2$, respectively, the parasitic capacitance between the nodes 1 and $i_1$ and between the nodes $i_1$ and n may be denoted as $kC_1$ and $kC_2$, respectively, where k is a constant less than 1 inserted to offset the lower parasitic capacitance generated by the repair line relative to the data line.

In the equivalent circuit of FIG. 13, the total RC delay resulting from transmittal of signals from node G to node O is accumulation of RC delay resulting from ($R_1 \times kC_1$), ($R_2 \times kC_2$), ($R_2 \times C_2$), and ($R_1 \times C_1$).

In comparison, in the equivalent circuit of FIG. 14 wherein in the connection $m_1$ is inserted between the repair line and the data line, the total RC delay resulting from transmittal of signal from node G to node O is accumulation of RC delay resulting from ($R_1 \times kC_1$) and ($R_1 \times C_1$). Therefore, the total RC delay value according to the second first preferred embodiment is much less than that of the first preferred embodiment.

Moreover, if connections are added at the upper and lower parts of the green data line and the repair line in addition to the connection $m_1$ at the mid-point, there is no need to repair a green data line when a disconnection results thereon.

FIG. 15 illustrates a third first preferred embodiment of the present invention on repairing method of a disconnected data line in the TFT substrate having duplicate gate lines. The duplicate gate line comprises a primary branch which forms a plurality of the gate electrodes of TFT transistors, and a secondary branch which is connected to the primary branch. With respect to such TFT substrates, the technique of the second first preferred embodiment may be worked without inserting a connection between the green data line and the repair line. The structure of the repair line illustrated in FIG. 15 is the same as that illustrated in FIG. 5. The first data line in each data-line block is a green data line.

Assume a green data line is disconnected. In order to repair the green data line, the crossing point $g_1$ of the first horizontal line 300$a$ and the green data line and the crossing point $g_2$ of the second horizontal line 300$b$ and the green data line are shorted (▲) with laser. The crossing point $g_3$ of the secondary branch $G_r$ and the green data line, and the crossing point $g_4$ of the secondary branch $G_r$ located at the middle of the active region and the vertical portion 300$c$ of the repair line 300 are shorted (▲) with laser. Then points // outside nodes $g_3$ and $g_4$ are disconnected with laser in order prevent gate line signals from being applied to the green data line. Nodes $g_3$ and $g_4$ performs the same function as the connection $m_1$ of the second first preferred embodiment. Although the third first preferred embodiment used a secondary branch $G_r$ located at the middle of the active region in place of the connection $m_1$, the repair according to the third first preferred embodiment may be performed by using a secondary branch $G_r$ located at places other than at the middle of the active region.

On the other hand, instead of using repair lines having two horizontal portions and a vertical portion, it is possible to use repair lines having only a vertical portion, i.e., a portion which is parallel to data lines, in a TFT substrate having duplicate of gate lines. Note the vertical portion itself comprises the entire repair line.

FIG. 16 shows the fourth first preferred embodiment of the present invention having such a wiring structure. A repair line 310 is placed parallel to data lines and adjacent to a green data line.

Assume that the green data line is disconnected and the exact location of the point of disconnection is not known. The green data line may be repaired as follows. First, the secondary branch $G_r$ of the uppermost gate line $G_1$, the secondary branch $G_r$ of the central gate line $G_i$, the secondary branch $G_r$ of the lowermost gate line $G_m$ are shorted (▲) with laser on their crossing points with the disconnected green data line and the repair line 310 adjacent thereto, i.e., the points $h_1$, $h_2$, $h_3$, $h_4$, $h_5$, and $h_6$. The points $h_7$, $h_8$, $h_9$, $h_{10}$, $h_{11}$, $h_{12}$ outside the shorted portions of the secondary branches $G_r$ are disconnected. As a result, the shorted portion $h_1$ and $h_2$ and the shorted portion $h_3$ and $h_4$ functions as the horizontal portions 300$a$, 300$b$ of the repair line in FIG. 15, and the shorted portion $h_5$ and $h_6$ functions as the connection $m_1$ in FIG. 12.

The above method may be used to repair disconnected red and blue data lines as well. Although FIG. 16 illustrated use of the secondary branch $G_r$ of the central gate line $G_i$, it is possible to use secondary branch $G_r$ of other gate lines to function as the connection between the disconnected data line and the repair line.

If the point of disconnection is known, the increase of RC delay resulting from repair may be reduced even more by using the following method. As shown in FIG. 17, assume the point of disconnection j is between the gate line $G_{j-1}$ and $G_j$. The secondary branches $G_r$ of gate lines $G_{j-1}$, $G_j$ are shorted (▲) at the crossing points with the disconnected green date line and the repair line 310 adjacent thereto, i.e., the points $j_1$, $j_2$, $j_3$ and $j_4$. The points outside $j_5$, $j_6$, $j_7$, $j_8$ of the shorted portions of the secondary branches $G_r$ are disconnected with laser. Also the points outside $j_9$, $j_{10}$ the shorted portions $j_2$, $j_4$ of the repair line 310 are disconnected with laser as well. As can be seen, the length of signal path after the repair is minimized and thus RC delay also is minimized.

On the other hand, by adding an additional connection to the third and fourth first preferred embodiments, a disconnected primary gate $G_m$ may be repaired by sending gate signals through the additional connection and a secondary gate line $G_r$. FIG. 18 illustrates such a means of repair according to a fifth preferred first preferred embodiment of the present invention.

In FIG. 18, which shows duplicate gate lines of primary gate lines $G_m$ and a secondary gate line $G_r$, the upper part and the lower part of a first connection 320 overlaps a data line 10 and connects to a secondary gate line $G_r$, respectively, and a second connection 330 connects to a primary gate line $G_m$ and the upper part of the first connection 320. Each of the second connection 330 is formed for a predetermined number of pixels. The primary gate line $G_m$, the secondary gate line $G_r$, the first connection 320, and the second connection 330 are formed on the same layer.

The gate lines above are covered with a gate insulator (not shown) which is in turn covered with a semiconductor layer 20, which is comprised of an amorphous silicon layer and a highly-doped amorphous silicon layer. A source electrode 11, a drain electrode 12, and a data line 10 are formed on the same layer over the semiconductor layer 20. A data repair line 310 is formed for a predetermined number of pixels in parallel to the data line 10. A protective layer (not shown) is placed over the layer above. A contact hole 30 is formed on the protective layer on top of the drain electrode 12. A pixel electrode overlaps on top of the first connection 320 and the primary and secondary lines $G_m$ and $G_r$ and connects to the drain electrode 12 through the contact hole 30. Storage capacitance is generated at a point where the pixel electrode 40 overlaps the first connection 320 and the primary and secondary gate lines $G_m$ and $G_r$.

The data repair line 310 is for repairing a disconnected data line as shown in FIGS. 16 and 17. For example, suppose a data line 10 is disconnected at point k. The secondary gate lines $G_r$ on above and below point k are shorted on the overlapping points $k_1$, $k_2$, $k_3$, and $k_4$ with the disconnected data line 10 and a data repair line in close proximity to point k. Then parts outside of the shorted secondary gate lines $G_r$ defined between the shorted points are disconnected at points $k_5$, $k_6$, $k_7$, and $k_8$. As a result, data signals are sent below the disconnected point $k_1$ through the data repair line 320.

The first and second connections 320 and 330 are for repairing a disconnected primary gate line $G_r$. When a primary gate line $G_r$ is disconnected, gate signals are sent by detour rout through the first connection 320, the second connection 330, and the secondary gate line $G_m$.

Although the data repair line 310 and the second connection 330 are formed for a plurality of pixels in FIG. 18, they may be formed each for a single pixel. Where they are formed each for a plurality of pixels, they should be each formed for a unit. Preferably, pixels should be grouped in units of three: red, green, and blue pixels. In particular, the data repair line 310 should be placed adjacent to a green data line as described in the third and fourth preferred embodiments of the present invention.

Although FIG. 18 does not have the second connection 330 overlapped with the pixel electrode 40, they may be arranged to be overlapped with each other and generate storage capacitance.

As described above, by repairing a disconnected data line according to the preferred embodiments of the present invention, the data repair lines may be shortened, which reduces electrical resistance and parasitic capacitance, thus minimizing picture signal distortion. Also, the present invention allows for repairing almost all data lines. Furthermore, the repairing process of a disconnected data line is substantially simplified by merely shortening two points on the data line without the disconnecting process if a data repair line has one side open according to an embodiment of the present invention.

What is claimed is:

1. A liquid crystal display panel having an active area, comprising:
   a plurality of gate lines formed on a substrate in one direction;
   a plurality of data lines crossing the gate lines; and
   a plurality of repair lines crossing a predetermined number of the data lines twice and crossing the gate lines in the active area.

2. The liquid crystal display panel as recited in claim 1, the repair lines comprising a first portion which crosses one end of the predetermined number of the data lines, a second portion which crosses the other end of the predetermined number of the data lines, and a third portion which connects the first and second portions together and which crosses the gate lines in the active area.

3. A liquid crystal display panel having an active area, comprising:
   a plurality of gate lines formed on the substrate in horizontal direction;
   a plurality of data-line blocks, each including at least one of data lines which are formed on the substrate in vertical direction crossing the gate lines; and
   a plurality of repair lines crossing the data lines of a data-line block twice and crossing the gate lines in the active area, wherein a repair line is formed for each data-line block.

4. The of liquid crystal display panel as recited in claim 3, wherein all the data lines of the data-line block cross twice at least one of the repair lines.

5. The liquid crystal display panel as recited in claim 4, the repair line comprising a first portion which crosses one end of the data lines, a second portion which crosses the other end of the data lines, and a third portion which connects the first and second portions together and which crosses the gate lines in the active area.

6. The liquid crystal display panel as recited in claim 5, wherein the third portion of the repair line which crosses the data lines of a data-line block is placed in close proximity to one of the data lines of the data-line block.

7. The liquid crystal display panel as recited in claim 6, wherein the third portion of the repair line which crosses the data lines of the data-line block is placed in between two of the data lines of the data-line block.

8. The liquid crystal display panel as recited in claim 5, wherein the first and second portions of the repair line which cross the data lines of a data-line block cross twice the data lines of an adjacent data-line block adjacent to the data-line block.

9. The liquid crystal display panel as recited in claim 8, wherein one of the two repair lines crossing the data lines of a data-line block crosses the data lines from inside of the other repair line, and the former repair line crosses the data lines of an adjacent data-line block adjacent to the data-line block from outside of another repair line crossing the data lines of the adjacent data-line block.

10. The liquid crystal display panel as recited in claim 5, wherein a data-line block has three data lines.

11. The liquid crystal display panel as recited in claim 10, wherein the three data lines in a data-line block are red, green, and blue data lines, respectively.

12. The liquid crystal display panel as recited in claim 11, wherein the third portion of the repair line is placed adjacent to the green data line of the data-line block.

13. The liquid crystal display panel as recited in claim 12, further comprising a first connection connecting the green data line and the third portion of the repair line.

14. The liquid crystal display panel as recited in claim 13, wherein the first connection connects the mid-points of the third portion of the repair line and the green data line.

15. The of liquid crystal display panel as recited in claim 14, further comprising a second connection connecting the upper parts of the third portion of the repair line and the green data line and a third connection connecting the lower parts of the third portion of the repair line and the green data line.

16. A method of repairing data lines of a liquid crystal display having a plurality of gate lines in one direction and a plurality of data lines crossing the gate lines in an active area of the liquid crystal display, comprising the steps of:
   forming a plurality of repair lines, each crossing both ends of at least one of the data lines and crossing the gate lines in the active area; and
   shorting the crossing points of the repair line and a first-disconnected data line.

17. The method as recited in claim 16, wherein the data lines are grouped into the data-line blocks having at least one data line, and all data lines of a first data-line block are crossed by a first repair line and by a second repair line which crosses all the data lines of a second data-line block adjacent to the first data-line block.

18. The method as recited in claim 17, further comprising the step of: shorting the crossing point of the second repair line and a second-disconnected data line of the first data-line block including the first disconnected data line shorted to the first repair line.

19. The method as recited in claim 16, wherein the data lines include red, green, and blue data lines; and further comprising the step of forming a connection between the green data line and the repair line.

20. The method as recited in claim 19, further comprising the step of disconnecting the connection when the first disconnected data line is the red or blue data line for transmitting red or blue picture signals.

* * * * *